US012496872B2

(12) United States Patent
Nakajima et al.

(10) Patent No.: US 12,496,872 B2
(45) Date of Patent: Dec. 16, 2025

(54) IN-VEHICLE AIR CONDITIONER

(71) Applicant: TOYOTA JIDOSHA KABUSHIKI KAISHA, Aichi-ken (JP)

(72) Inventors: Yuha Nakajima, Toyota (JP); Makoto Mimoto, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 150 days.

(21) Appl. No.: 18/625,203

(22) Filed: Apr. 3, 2024

(65) Prior Publication Data
US 2024/0336112 A1    Oct. 10, 2024

(30) Foreign Application Priority Data
Apr. 6, 2023    (JP) ................. 2023-062331

(51) Int. Cl.
*B60H 1/00*    (2006.01)
(52) U.S. Cl.
CPC ................ *B60H 1/00828* (2013.01)
(58) Field of Classification Search
CPC ........... B60H 1/00828; B60H 1/00778; B60H 1/00385; B60H 1/00742; B60H 1/00735; B60H 1/00821; B60H 1/00878; B60H 1/3205
See application file for complete search history.

(56) References Cited

U.S. PATENT DOCUMENTS

| | | | |
|---|---|---|---|
| 5,275,012 A * | 1/1994 | Dage ................. | B60H 1/00764 219/202 |
| 2019/0111761 A1* | 4/2019 | Jaglan ............... | B60H 1/00828 |
| 2021/0309077 A1* | 10/2021 | Lee .......................... | G07C 5/08 |
| 2023/0373273 A1* | 11/2023 | Ye ........................ | B60H 3/0092 |

FOREIGN PATENT DOCUMENTS

| | | |
|---|---|---|
| JP | 2006298014 A | 11/2006 |
| JP | 2015-089710 A | 5/2015 |
| JP | 2015-104143 A | 6/2015 |
| WO | 2015068362 A1 | 5/2015 |

* cited by examiner

*Primary Examiner* — Marc E Norman
(74) *Attorney, Agent, or Firm* — HAUPTMAN HAM, LLP

(57) ABSTRACT

An in-vehicle air conditioner includes a blower configured to send blown air to a vehicle compartment, a cooling device having a heat exchanger for cooling the blown air, and a controller configured to control the blower and the cooling device. The controller operates the blower to perform a simplified pre-air-conditioning for introducing outside air into the vehicle compartment while the cooling device is stopped, in a case where an in-vehicle battery is being charged by an external power supply and no occupant is present in the vehicle compartment. In the simplified pre-air-conditioning, the controller increases output of the blower during a predetermined period of time in a case where the cooling device has been operating immediately before an ignition switch is turned off, so as to be greater as compared to a case where the cooling device has not being operating immediately before the ignition switch is turned off.

4 Claims, 4 Drawing Sheets

IN-VEHICLE AIR CONDITIONER

CROSS REFERENCE TO RELATED APPLICATION

This application claims priority to Japanese Patent Application No. 2023-062331 filed on Apr. 6, 2023, which is incorporated herein by reference in its entirety including the specification, claims, drawings, and abstract.

TECHNICAL FIELD

The present disclosure relates to an in-vehicle air conditioner that includes a heat exchanger for cooling blown air that is blown into the vehicle compartment.

BACKGROUND

The electrically powered vehicles such as Battery Electric Vehicles (BEV) and Plug-in Hybrid Electric Vehicles (PHEV) are known. In the electrically powered vehicle, the in-vehicle battery is charged by power supplied from an external power supply while the vehicle is parked. The in-vehicle battery not only supplies power to the motor for driving, but also to the in-vehicle air conditioner.

The air conditioner installed in the vehicle air-conditions the vehicle compartment by blowing temperature-controlled blown air into the vehicle compartment. The air conditioner includes a cooling device that cools the blown air, and the cooling device has a refrigerant circuit composed of a refrigerant circulation path. The refrigerant circuit includes a compressor and an evaporator. The compressor is driven by the in-vehicle battery and compresses the refrigerant to circulate the refrigerant in the circulation path. The evaporator as a heat exchanger cools the blown air that passes through the evaporator by vaporizing the compressed and liquefied refrigerant. At this time, the evaporator cools the air that passes through it, causing the moisture in the air to condense, thereby dehumidifying the air downstream of the evaporator.

The pre-air-conditioning technology is also known to improve the comfort of the vehicle compartment by operating the air conditioner before people get into the vehicle. Patent Literature 1 (JP 2015-104143 A) discloses, with respect to electrically powered vehicle, a control unit that, in addition to charging the in-vehicle battery using an external power supply, operates the air conditioner using the external power supply to perform pre-air-conditioning.

CITATION LIST

Patent Literature

PATENT LITERATURE 1: JP 2015-104143 A

SUMMARY

In a configuration where the in-vehicle battery is charged by an external power supply and the air conditioner is operated by the external power supply, the charge of the in-vehicle battery may not be completed in the desired time because there is a limit to the power that can be supplied from the external power supply. For example, if the temperature of vehicle compartment is high and the power consumption of the in-vehicle air conditioner is high, the power supplied to the in-vehicle battery would be reduced and the in-vehicle battery charge may not be completed in the desired time.

Therefore, in order to reduce the power consumption of the air conditioner during battery charging by the external power supply, a simplified pre-air-conditioning is considered to be performed by operating the blower to introduce outside air into the vehicle compartment while the cooling device of the air conditioner is stopped. In this case, however, when condensate adheres to the evaporator surface due to condensation caused by the operation of the cooling device while the vehicle is traveling, the condensate would evaporate due to blown air. When the condensate on the surface of the evaporator evaporates, mold and particulates dissolved in the condensate are mixed with the vapor and blown out into the vehicle compartment, resulting in the generation of foul odors and foul smells in the vehicle compartment. When people get into the vehicle at the timing when the condensate evaporates or immediately afterwards, the odor can cause discomfort.

Therefore, an object of the present disclosure is to suppress occupant discomfort caused by the odor generated by evaporation of condensate on the surface of the evaporator as a heat exchanger in simplified pre-air-conditioning in which the blower is operated while the cooling device of the air conditioner is turned off.

An in-vehicle air conditioner includes a blower configured to send blown air to a vehicle compartment, a cooling device having a heat exchanger for cooling the blown air, and a controller configured to control the blower and the cooling device. The controller operates the blower to perform a simplified pre-air-conditioning for introducing outside air into the vehicle compartment while the cooling device is stopped, in a case where an in-vehicle battery is being charged by an external power supply and no occupant is present in the vehicle compartment. In the simplified pre-air-conditioning, the controller increases output of the blower during a predetermined period of time in a case where the cooling device has been operating immediately before an ignition switch is turned off, so as to be greater as compared to a case where the cooling device has not being operating immediately before the ignition switch is turned off.

According to the above configuration, the simplified pre-air-conditioning can suppress the temperature rise in the vehicle compartment due to solar radiation, etc., with little power consumption, thereby reducing discomfort caused by high temperatures in the vehicle interior for occupants when they get into the vehicle after the battery charging is completed. Since the power consumption of the air conditioner during battery charging is low, the battery charging time can be prevented from becoming long. Since the amount of operation of the in-vehicle air conditioner (cooling device) is reduced after occupants board the vehicle, the power consumption of the air conditioner during occupant boarding is suppressed and the driving distance of the vehicle can be extended by the in-vehicle battery.

Furthermore, according to the above configuration, the output of the blower is increased for a predetermined period of time when there is a high possibility that condensate is adhering to the surface of the heat exchanger due to the cooling device having been operating immediately before the vehicle ignition switch is turned off. This can promote the condensate to flow down from the heat exchanger and be discharged out of the vehicle through the drain water outlet. As a result, the amount of condensate on the surface of the heat exchanger is reduced and the concentration of odor components in the condensate released into the vehicle compartment can be diluted. In addition, since the output of the blower is increased, the possibility of evaporation of the condensate on the surface of the heat exchanger can be increased before occupants get into the vehicle. Thus, when occupants get into the vehicle, it is possible to prevent them from feeling uncomfortable due to the odor of the condensate.

In the in-vehicle air conditioner according to the present disclosure, during the period of time in which the output of the blower is increased in the simplified pre-air conditioning, the controller may be configured to close an air outlet from which the blown air is injected toward a front seat and open another air outlet from which the blown air is injected toward a rear seat.

According to the above configuration, since occupants generally have a higher probability of boarding a vehicle in the front seat where the driver's seat is located than in the rear seat, closing the air outlet of the front seat and opening the air outlet of the rear seat in the period when the output of the blower is increased can prevent occupants from smelling condensate when they get into the vehicle during that period. This can suppress the smell of condensate when occupants get into the vehicle during that period.

In the in-vehicle air conditioner according to the present disclosure, the controller may be configured to avoid performing the simplified pre-air-conditioning when: (i) an outside temperature is lower than a predetermined temperature that may cause the vehicle compartment to have a high temperature uncomfortable for the occupant, or (ii) an amount of sunlight irradiating the vehicle compartment is smaller than a predetermined amount of sunlight that may increase a temperature of the vehicle compartment.

According to the above configuration, the frequency of blower operation can be reduced, and deterioration and failure of the blower can be suppressed.

According to the present disclosure, it is possible to prevent occupants from feeling uncomfortable due to the odor generated by the evaporation of condensate on the surface of the heat exchanger.

BRIEF DESCRIPTION OF DRAWINGS

Embodiments of the present disclosure will be described based on the following figures, wherein.

DESCRIPTION OF EMBODIMENTS

The embodiments of the present disclosure are described below based on the drawings. The present disclosure is not limited to the embodiments described herein. In all drawings, identical elements are marked with the same symbol and redundant explanations are omitted.

Figure 1:
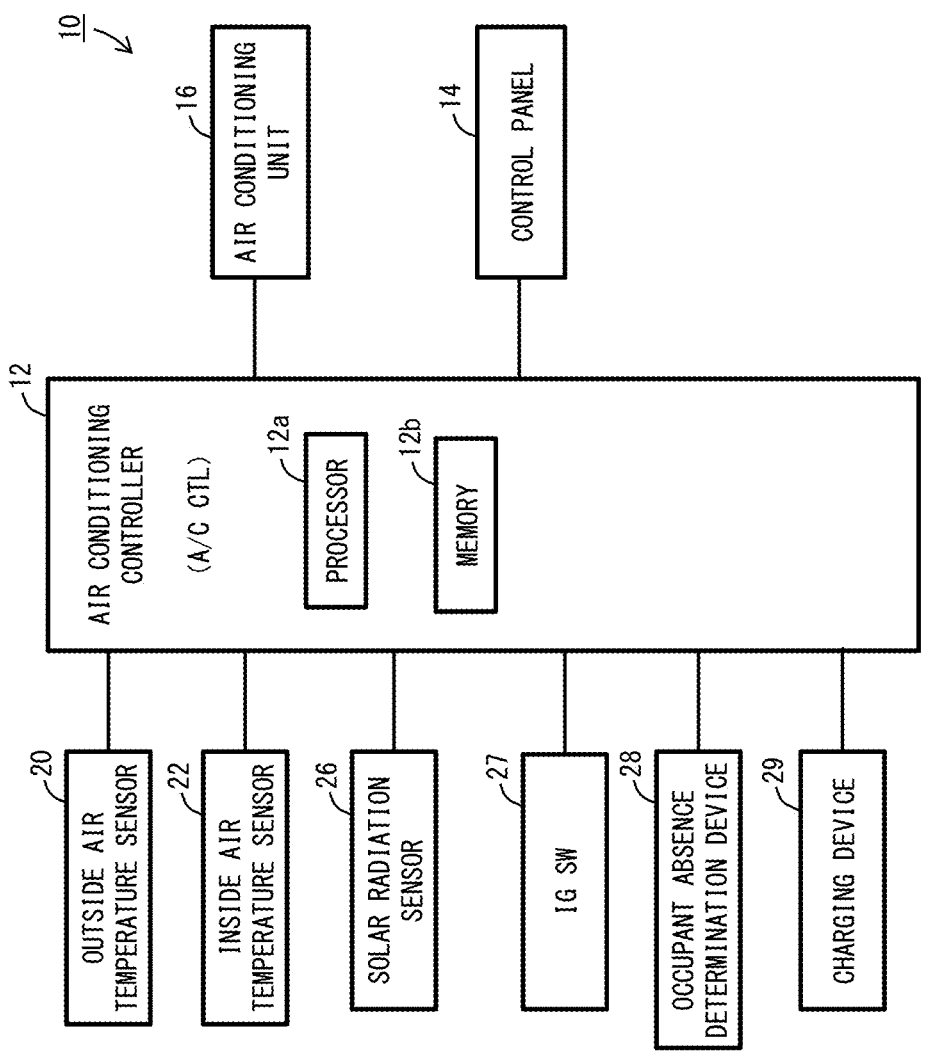
FIG. 1 is a diagram of an in-vehicle air conditioner.

FIG. 1 is a block diagram of an in-vehicle air conditioner 10. This air conditioner 10 is installed in a vehicle, and is for air conditioning the interior of the vehicle. This air conditioner 10 is installed in an electrically powered vehicle having a motor for driving driven by a battery as the driving source, for example, Battery Electric Vehicle or Plug-in Hybrid Electric Vehicle. In this specification, when simply referring to a battery, it means an in-vehicle battery.

Battery Electric Vehicle obtains driving power for driving the vehicle from an electric motor. In Battery Electric Vehicle, the battery is charged by an external power supply while the vehicle is parked. Battery Electric Vehicle travels by supplying battery power to the electric motor.

Plug-in Hybrid Electric Vehicle obtains driving power for driving the vehicle from both an engine and an electric motor. In Plug-in Hybrid Electric Vehicle, the battery is charged by an external power supply when the vehicle is parked. When the remaining amount of electricity stored in the battery is equal to or greater than the predetermined standard remaining amount for driving, the vehicle is in the EV driving mode, in which the vehicle is driven mainly by the driving force of the electric motor. On the other hand, when the remaining amount of electricity stored in the battery is lower than the standard remaining amount for driving, the HV driving mode is used, in which the vehicle is driven mainly by the driving force of the engine. The use of the EV driving mode reduces fuel consumption by the engine.

In the electrically powered vehicle, the battery provides power to the electric motor for driving and to the various electric devices in the air conditioner 10.

The air conditioner 10 in this embodiment performs simplified pre-air-conditioning to air-condition the vehicle compartment before occupants get into the vehicle, in addition to normal air-conditioning to air-condition the vehicle compartment when the vehicle is traveling. The air conditioner 10 is configured to be able to perform simplified pre-air-conditioning using not only the power stored in the battery but also the power supplied by the external power supply while the battery is being charged by the external power supply.

The air conditioner 10 has an air conditioning unit 16 and a control panel 14, as shown in FIG. 1. The air conditioning unit 16 is a unit that sends temperature-controlled air into the vehicle interior. Details of the air conditioning unit 16 are described below.

The control panel 14 receives operating instructions for the air conditioner 10 from the occupant. The control panel 14 has a plurality of switches for receiving instructions from the occupant and a display unit for presenting information to the occupant. The "switches" here can be mechanical switches or virtual switches displayed on the touch panel. By using this control panel 14 from the occupant, the occupant switches the air conditioner 10 on or off, switches the air conditioning mode of the air conditioner 10, and the like.

The air conditioner 10 has a plurality of temperature sensors 20, 22. The outside air temperature sensor 20 detects the temperature outside the vehicle (outside temperature). The inside air temperature sensor 22 detects the temperature inside the vehicle (inside temperature). The detection results of the temperature sensors 20, 22 are input to the air conditioning controller 12. The air conditioner 10 further has a solar radiation sensor 26. The solar radiation sensor 26 detects the amount of sunlight irradiating into the vehicle compartment. The detection results of the solar radiation sensor 26 are input to the air conditioning controller 12.

The air conditioning unit 10 has an air conditioning controller 12. The air conditioning controller 12 controls various devices included in the air conditioning unit 16. The air conditioning controller 12 is physically a computer with a processor 12a and a memory 12b. This "computer" also includes a microcontroller that incorporates a computer system in a single integrated circuit. The processor 12a may be single or may comprise multiple elements that are mechanically separated from each other. Similarly, the memory 12b may be a single element or may comprise multiple elements that are mechanically located apart. The memory 12b may include, for example, at least one semiconductor memory (e.g., RAM, ROM, solid state drive, etc.) and a magnetic disk (e.g., hard disk drive, etc.). The air conditioning controller 12 may be a computer provided exclusively for the air conditioner 10, or a controller used in another device may be used as the air conditioning controller 12. The air conditioning controller 12 is hereinafter also referred to simply as controller 12.

The vehicle has an ignition switch 27, an occupant absence determination device 28, and a charging device 29. A signal indicating the on/off of the ignition switch 27 is input to the controller 12.

The occupant absence determination device 28 determines whether or not an occupant is absent in the vehicle compartment. For example, the occupant absence determination device 28 determines that an occupant is not present in the vehicle compartment when it is detected by the seat occupancy sensor that the occupant is not sitting on a seat. The determination result of the determination device 28 is input to the controller 12. The determination device 28 may determine that an occupant is absent in the vehicle compartment when at least one of the following conditions 1 to 5 is satisfied.

(Condition 1) The occupant is not seated.
(Condition 2) Seatbelts are not fastened.
(Condition 3) No switches in the vehicle compartment have been operated for a predetermined period of time.
(Condition 4) The driver's side door has been detected to be open.
(Condition 5) The charging cable is connected to the vehicle's charging inlet.

The charging device 29 is a device for charging in-vehicle battery. The charging device 29 includes a charging inlet. A charging facility external to the vehicle (external power supply facility) includes a charging cable. A charging connector is provided at the end of the charging cable. When the charging connector of the charging cable is connected to the charging inlet of the vehicle's charging device 29, the battery is charged. The charging device 29 outputs a signal to the controller 12 indicating whether the charging cable (charging connector) is connected to the charging inlet or not.

Figure 2:
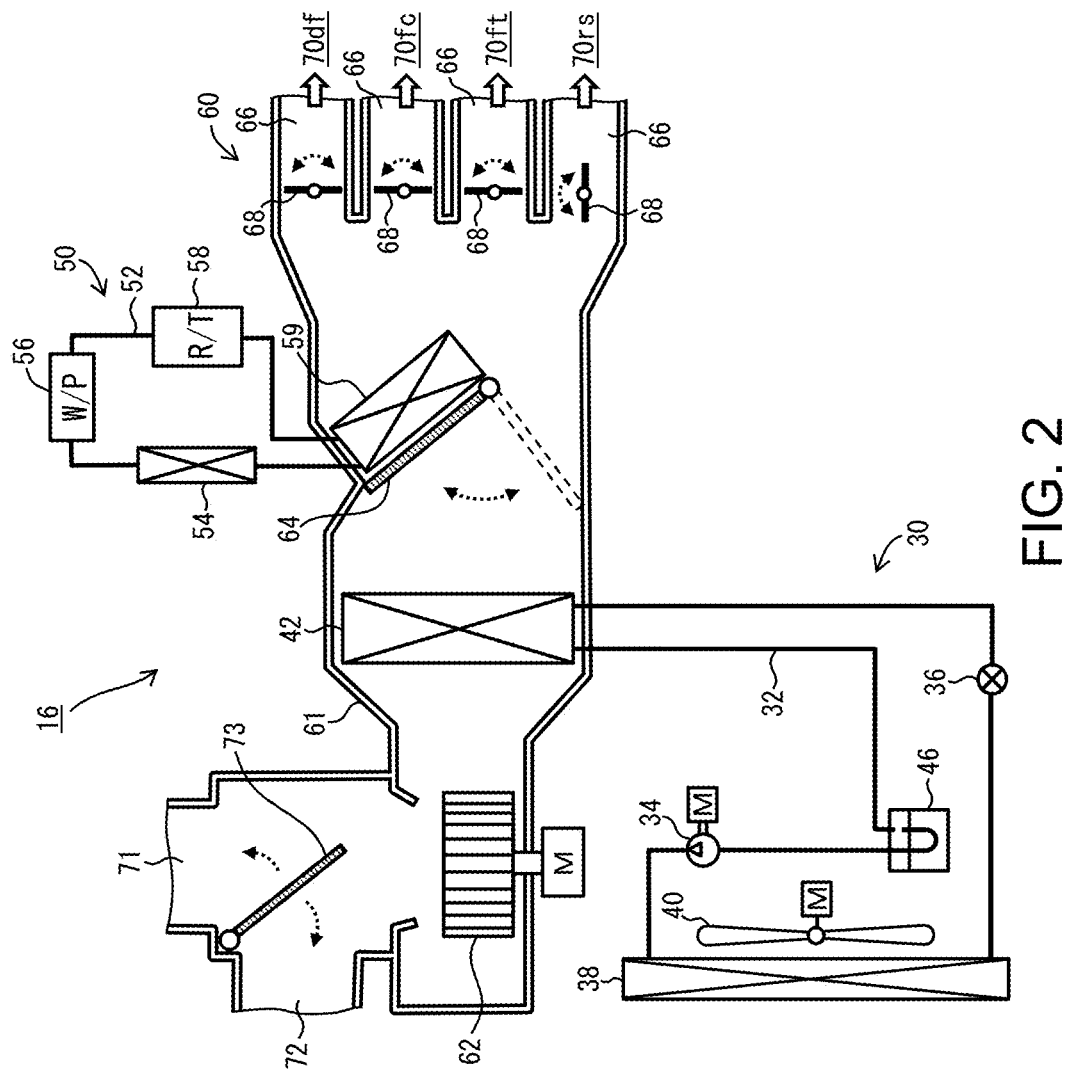
FIG. 2 is a diagram of the air conditioning unit.

Next, the configuration of the air conditioning unit 16 is described in detail with reference to FIG. 2. The air conditioning unit 16 is broadly divided into a cooling device 30, a heating device 50, and a blowing mechanism 60.

The cooling device 30 includes a refrigerant circuit. The refrigerant circuit has flow path 32 through which the air conditioning refrigerant flows. The cooling device 30 is used for cooling and dehumidifying the interior of the vehicle (vehicle compartment). Specifically, the flow path 32 has a compressor 34, a condenser 38, an expansion valve 36, an evaporator 42, and an accumulator 46. The air conditioning refrigerant is pressurized by the compressor 34 to become a hot, high-pressure gas. The condenser 38 is a heat exchanger that exchanges the air conditioning refrigerant with the outside air. To increase the efficiency of this heat exchange, a condenser fan 40 is installed behind the condenser 38. The air conditioning refrigerant gas is cooled by passing through condenser 38 and becomes a gas-liquid mixture. The expansion valve 36 reduces the pressure of the air conditioning refrigerant in the gas-liquid mixed state. The depressurized air conditioning refrigerant vaporizes in the evaporator 42. The latent heat from this vaporization cools the air around the evaporator 42. After passing through the evaporator 42, the air conditioning refrigerant is separated into gas and liquid by the accumulator 46, and only the gas phase air conditioning refrigerant is supplied back to the compressor 34.

When the compressor 34 (refrigerant compressor) of the cooling device 30 is operating, the cooling device 30 can be said to be operating. When the compressor 34 is stopped, the cooling device 30 can be said to be stopped.

The heating device 50 is mainly used for heating and has a flow path 52 through which a heating refrigerant (e.g., water) flows. The flow path 52 has a water pump 56, a water heater 54, a heater core 59, and a reserve tank 58. The water pump 56 pumps the heating refrigerant. The water heater 54 heats the heating refrigerant by receiving an electric power supply and has an electric heater. For example, a PTC heater with a PTC element (i.e., positive characteristic thermistor) can be used as the electric heater. The heated heating refrigerant exchanges heat with the surrounding air as it flows through the heater core 59. This heat exchange heats the air surrounding the heater core 59. The reserve tank 58 stores excess heating refrigerant.

When at least one of the water pump 56 and the water heater 54 of the heating device 50 is operating, the heating device 50 can be said to be operating. When both the water pump 56 and the water heater 54 are stopped, the heating device 50 can be said to be stopped.

The blowing mechanism 60 is a mechanism that blows temperature-controlled air into the interior of the vehicle (vehicle compartment). The blowing mechanism 60 has a housing 61. At the upstream end of housing 61, there are inside air inlet 71 and outside air inlet 72. The inside air inlet 71 is an air inlet that draws air from the vehicle compartment into the housing 61. The outside air inlet 72 is an air inlet that draws air from outside the vehicle into the housing 61. An inside air/outside air switching door 73 is located adjacent to the inside air inlet 71 and the outside air inlet 72. The inside air/outside air switching door 73 is driven by an actuator to change the opening between the inside air inlet 71 and the outside air inlet 72.

A blower 62 is located downstream from the inside air/outside air switching door 73. The blower 62 draws air from the inside air inlet 71 or the outside air inlet 72 and sends it downstream of housing 61. An evaporator 42, an air-mix door 64, and a heater core 59 are located downstream of the blower 62. As mentioned above, the evaporator 42 cools the air sent from the blower 62 during cooling operation by the latent heat of the air-conditioning refrigerant as it vaporizes. The cooled air is output to the vehicle compartment to cool the vehicle compartment.

The air-mix door 64 is located upstream of the heater core 59 and regulates the amount of airflow through the heater core 59. During heating operation, the air-mix door 64 moves to a position where it does not block the heater core 59 (the position indicated by the dashed line in FIG. 2). This allows the airflow sent from the blower 62 to pass through the heater core 59 and be heated. The heated air conditioned air is output to the vehicle compartment, thereby heating the vehicle compartment.

The downstream end of housing 61 is divided into a plurality of passages 66 (four in the illustrated example), each of which has an adjustment door 68. Each passage 66 is connected to specific air outlet. In this case, the air outlets include a defroster air outlet 70df facing the windshield, a face air outlet 70fc facing the occupant's face, a foot air outlet 70ft facing the occupant's feet, and a rear seat air outlet 70rs facing the rear seat of the vehicle. The air outlets 70fc and 70ft are front seat air outlets facing the front seats of the vehicle. The controller 12 adjusts the air volume of the air-conditioning air output from each of the air outlets 70df, 70fc, 70ft, 70rs by moving the adjustment door 68 corresponding to each of the air outlets 70df, 70fc, 70ft, 70rs.

Next, the operation of the air conditioner 10 is described. Here, first, the air conditioning when the vehicle is driving (normal air conditioning) is described.

The control panel 14 has, for example, an activation switch for the air conditioner 10, an auto switch to set or cancel the automatic control of the air conditioner 10, an operation mode switch to change the operation mode, an air outlet mode switch to change the air outlet mode, an air volume setting switch for the blower 62, a vehicle compartment temperature setting switch that sets the target temperature Tset in the vehicle compartment, and the like.

The controller 12 reads the operation signals from the control panel 14 and the detection signals from the sensors 20, 22, and 26 for air conditioning control. Then, the controller 12 calculates the target air outlet temperature TAO of the air blown to the vehicle compartment. The target air outlet temperature TAO is a value determined to quickly bring the inside temperature Tr close to the occupant's desired target temperature Tset, and is calculated by the following formula (1).

$$TAO = Kset \times Tset - Kr \times Tr - Kam \times Tam - Ks \times Ts + C \quad (1)$$

Here, Tset is the target temperature inside the vehicle compartment set by the vehicle compartment temperature setting switch, Tr is the inside temperature detected by the inside air temperature sensor 22, Tam is the outside temperature detected by the outside air temperature sensor 20, and Ts is the amount of sunlight detected by the solar radiation sensor 26. Kset, Kr, Kam, and Ks are control gains, and C is a constant for correction.

The controller 12 controls the cooling device 30, the heating device 50, the blower 62, the inside air/outside air switching door 73, the air-mix door 64, and the adjustment doors 68, etc. based on the target air outlet temperature TAO and the operation signals from the control panel 14. Since such control of normal air conditioning is a known technology, a detailed explanation is omitted.

Figure 3:
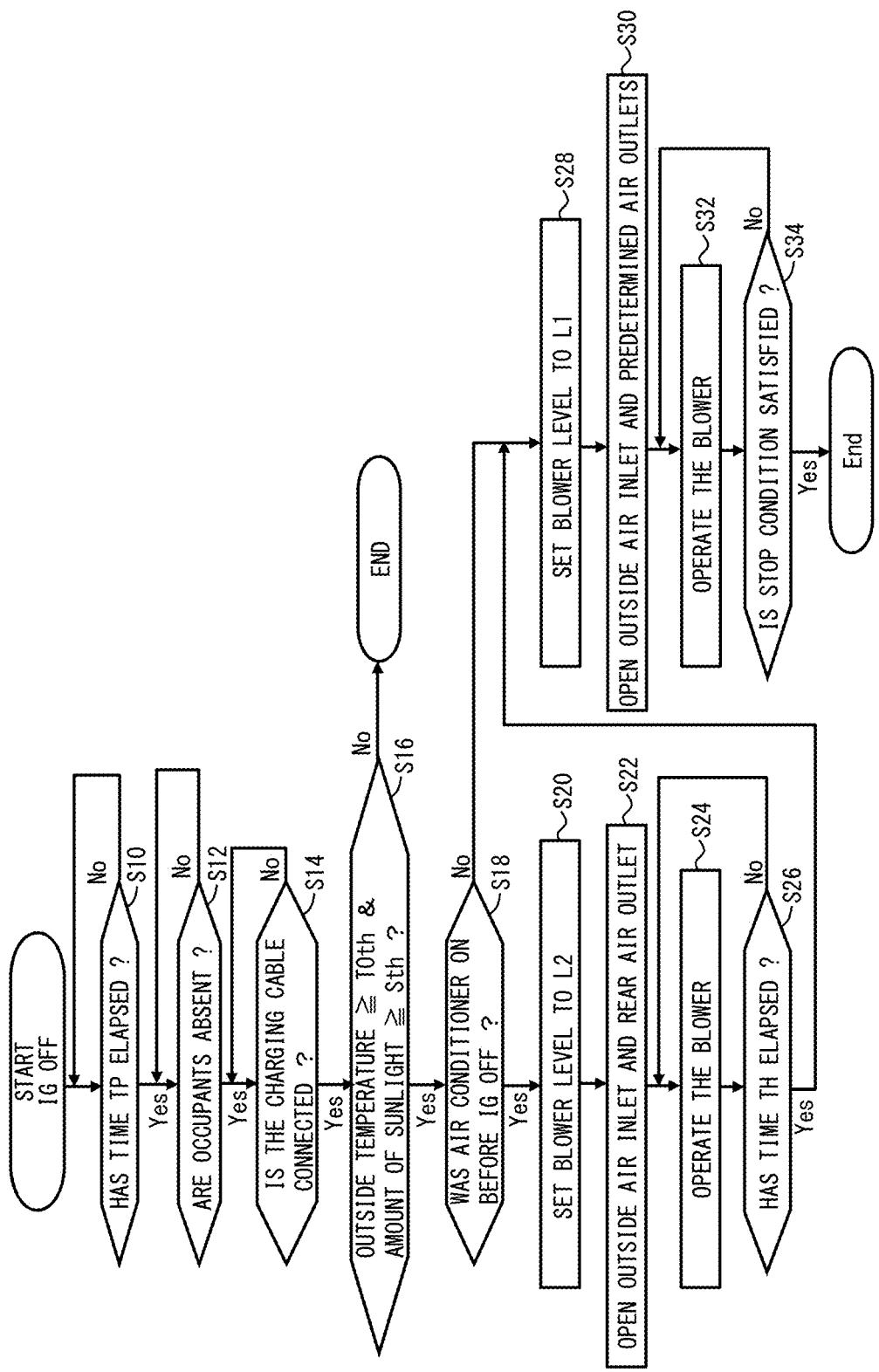
FIG. 3 is a flowchart showing the process of simplified pre-air-conditioning by the air conditioner.

Next, the simplified pre-air-conditioning is explained in detail. FIG. 3 is a flowchart showing the process of the simplified pre-air-conditioning. The controller 12 starts the process shown in the flowchart in FIG. 3 when the vehicle's ignition switch 27 is switched from on to off. If the air conditioner 10 is operating when the ignition switch 27 is on, the air conditioner 10 stops when the ignition switch 27 is switched to off.

In step S10, the controller 12 confirms whether a predetermined period of time tp has elapsed since the ignition switch 27 was turned off. If step S10 is No, the controller 12 waits for time tp to elapse. If step S10 is Yes, the controller 12 proceeds to step S12. This increases the likelihood that the next step S12 determines the absence of occupants (step S12: Yes).

In step S12, the controller 12 confirms that no occupant is present in the vehicle based on the determination results from the occupant absence determination device 28. If step S12 is No (occupants are present in the vehicle), the controller 12 waits until there are no occupants in the vehicle. If step S12 is Yes (no occupant is present in the vehicle), the controller 12 proceeds to step S14. This means that the simplified pre-air-conditioning (step S24, S32) described below is performed when there are no occupants in the vehicle, so that the occupants are prevented from feeling uncomfortable due to the odor of evaporating condensate on the surface of evaporator 42.

In step S14, the controller 12 confirms whether the charging cable is connected to the vehicle and the in-vehicle battery is being charged by an external power supply or is available for charging, based on the signal from the charging device 29. If step S14 is No (the charging cable is not connected), the controller 12 waits for the charging cable to be connected to the vehicle. If step S14 is Yes (the charging cable is connected), the controller 12 proceeds to step S16. This allows the simplified pre-air-conditioning (step S24, S32) to be performed using power from the external power supply without reducing the remaining amount of electricity stored in the in-vehicle battery.

In step S16, the controller 12 confirms whether the detected value of the outside air temperature sensor 20 (outside temperature) is greater than or equal to a predetermined temperature TOth and the detected value of the solar radiation sensor 26 (amount of sunlight) is greater than or equal to a predetermined amount of sunlight Sth. The predetermined temperature TOth is the outside temperature (20 degrees Celsius or thereabouts as an example) that may raise the vehicle compartment temperature to a temperature at which occupant comfort is impaired. TOth may be determined by taking into account the increase in the vehicle compartment temperature due to solar radiation irradiating the vehicle compartment. The predetermined amount of sunlight Sth is the amount of sunlight that may increase the temperature of the vehicle compartment.

If step S16 is No, the controller 12 terminates the process of the flow chart in FIG. 3. This means that the controller 12 avoids performing the simplified pre-air-conditioning (step S24, S32) when the outside temperature of the vehicle is lower than the predetermined temperature TOth or when the amount of sunlight irradiating the vehicle compartment is lower than the predetermined amount of sunlight Sth. This avoids performing the simplified pre-air-conditioning unnecessarily. The frequency of performing the simplified pre-air-conditioning can be reduced, and the failure and deterioration of the blower 62 can be suppressed. In addition, since the simplified pre-air-conditioning is not performed, more power from the external power supply can be supplied to the battery to increase the efficiency of battery charging. On the other hand, if step S16 is Yes, the controller 12 proceeds to step S18.

In step S18, the controller 12 confirms whether the cooling device 30 of the air conditioner 10 has been operating immediately before the ignition switch 27 is turned off. If step S18 is No (the cooling device 30 has been not operating immediately before the above timing), the controller 12 proceeds to step S28.

In step S28, the controller 12 sets the blower level to the first level. The blower level is the output level of the blower 62, i.e., the level of the number of revolutions (rotation speed) of the blower 62. The higher the blower level, the higher the speed of the blower 62. The first level is a lower blower level than the second level (see step S20) described below, and is a blower level at which the speed of the blower 62 is relatively low.

Next, in step S30, the controller 12 operates the inside air/outside air switching door 73 to open the outside air inlet 72, and operates each of the adjustment doors 68 to open the predetermined air outlets. The predetermined air outlets are, for example, all air outlets 70df, 70fc, 70ft, 70rs.

In step S32, the controller 12 operates the blower 62. As a result, while the cooling device 30 and the heating device 50 are stopped, the blower 62 is operated at the first level to perform the simplified pre-air-conditioning in which outside air is introduced into the vehicle compartment. In other words, ventilation is performed inside the vehicle. This simplified pre-air-conditioning can suppress the temperature rise in the vehicle compartment due to solar radiation, etc., with low power consumption, and can reduce discomfort due to high temperatures inside the vehicle for occupants when they get into the vehicle after the battery charge is completed. Since the power consumption of the air conditioner 10 during battery charging is low, the battery charging time can be suppressed to be long. Since the amount of operation of the air conditioner 10 (cooling device 30) is reduced during vehicle travel after occupants have boarded the vehicle, the power consumption of the air conditioner 10 can be suppressed and the vehicle travel distance by the battery can be extended.

In step S34, the controller 12 confirms whether the stop condition of the simplified pre-air-conditioning has been satisfied. The stop condition may be, for example, that the presence of occupants in the vehicle compartment has been detected by the occupant absence determination device 28, or that the ignition switch 27 has been switched from off to on. The controller 12 continues the simplified pre-air-conditioning (step S32) until the stop condition is satisfied. When the stop condition is satisfied (step S34: Yes), the controller 12 terminates the process of the flow chart in FIG. 3.

On the other hand, in step S18, the controller 12 proceeds to step S20 if the cooling device 30 of the air conditioner 10 has been operating immediately before the ignition switch 27 is turned off (step S18: Yes). This is the case where condensate is likely to have adhered to the surface of the evaporator 42 due to the operation of the cooling device 30. In step S20, the controller 12 sets the blower level to the second level. The second level is a blower level higher than the aforementioned first level (see step S28), and is the blower level at which the speed of the blower 62 is relatively high.

Next, in step S22, the controller 12 operates the inside air/outside air switching door 73 to open the outside air inlet 72. The controller 12 also operates the door 68 corresponding to the air outlet 70rs for the rear seat to open the air outlet 70rs, and operates the doors 68 corresponding to the other air outlets 70df, 70fc, 70ft to close those air outlets 70df, 70fc, 70ft. In other words, the controller 12 opens the air outlet 70rs that face the rear seat of the vehicle and closes the air outlets 70df, 70fc, 70ft on the front side of the vehicle, including the air outlets 70fc, 70ft that face the front seat of the vehicle.

The occupants are more likely to get into the front seat of the vehicle, where the driver's seat is located, than into the rear seat of the vehicle. Therefore, during the period when the blower 62 is operated at the second level (L2) (time 0 to tH in FIG. 4) (see details below), the air outlet 70rs of the rear seat of the vehicle is opened and the air outlets 70df, 70fc, 70ft of the front side of the vehicle are closed. This prevents occupants from smelling condensate when they get into the vehicle during that period.

The air outlet 70rs for the rear seat may be feet air outlet that faces the feet of the occupant when he or she is seated in the rear seat. This can suppress the smell of condensate to occupants even when they are seated in the rear seat of the vehicle.

Figure 4:
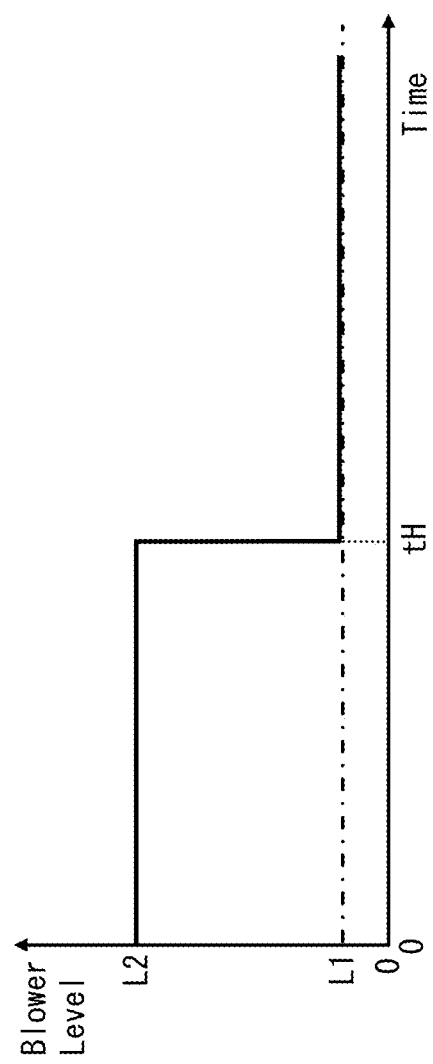
FIG. 4 is a figure to explain the blower levels.

Next, in step S24, the controller 12 operates the blower 62. As a result, while the cooling device 30 and the heating device 50 are stopped, the blower 62 is operated at the second level to perform the simplified pre-air-conditioning in which outside air is introduced into the vehicle compartment. In other words, ventilation inside the vehicle is performed. Then, in step S26, the controller 12 confirms whether a predetermined period of time tH has elapsed since the blower 62 started operating. If step S26 is No, the controller 12 continues the second level of blower operation until the time tH has elapsed. Then, when time tH has elapsed (step S26: Yes), the controller 12 reduces the blower level to the first level (step S28). FIG. 4 shows the blower level transition in this case. In this figure, L1 indicates the first level and L2 indicates the second level.

Next, in step S30, the controller 12 operates each of the adjustment doors 68 to open the predetermined air outlets (in this embodiment, all air outlets 70df, 70fc, 70ft, 70rs). The controller 12 then operates the blower 62 at the first level to continue the simplified pre-air-conditioning (step S32). Thus, the controller 12 performs the simplified pre-air-conditioning in which the blower 62 is operated at the second level (L2) for a predetermined period of time tH (time 0 to tH in FIG. 4), and then the blower 62 is operated at the first level (L1). When the stop condition is satisfied (step S34: Yes), the controller 12 terminates the process of the flow chart in FIG. 3.

According to the embodiment described above, if there is a high possibility that condensate is adhering to the surface of evaporator 42 due to the fact that the cooling device 30 has been operating immediately before the ignition switch 27 is turned off (step S18: Yes), the output of the blower 62 is increased for a predetermined period of time tH (second level). This can promote the condensate to flow down from the evaporator 42 and be discharged out of the vehicle through the drain water outlet (not shown) provided in the housing 61. As a result, the amount of condensate on the surface of evaporator 42 is reduced and the concentration of odor components in the condensate released into the vehicle compartment can be diluted. In addition, because the output of the blower 62 is increased, the possibility of evaporation of the condensate on the surface of evaporator 42 before occupants get into the vehicle can be increased. Thus, when occupants get into the vehicle, it is possible to suppress the occupants from feeling uncomfortable due to the odor of the condensate.

In the embodiment described above, the blower level (the speed of the blower 62) in the simplified pre-air-conditioning (step S32 in FIG. 3) was constant. However, for example, when the detected value (amount of sunlight) of the solar radiation sensor 26 is high, the speed of the blower 62 in the simplified pre-air-conditioning (step S32 in FIG. 3) may be higher than when it is low. In this way, the increase in the temperature of the vehicle compartment can be effectively suppressed.

In the embodiment described above, the amount of sunlight irradiating the vehicle compartment was detected (acquired) by the solar radiation sensor 26. However, for example, the vehicle may access a server that provides information on the amount of sunlight in various locations via a communication line such as the Internet, and acquire the amount of sunlight at the vehicle's current location from that server.

In the embodiment described above, the simplified pre-air-conditioning is performed in step S16 of FIG. 3 when the outside temperature of the vehicle is greater than or equal to a predetermined temperature TOth and the amount of sunlight irradiating inside the vehicle compartment is greater than or equal to a predetermined amount of sunlight Sth (steps S24, S32). However, the simplified pre-air-conditioning may be performed when the outside temperature of the vehicle is greater than or equal to a predetermined temperature TOth and the inside temperature (the temperature of the vehicle compartment) is greater than or equal to the outside temperature plus a predetermined temperature Tdf.

In the embodiment described above, with respect to the heating device 50 (see FIG. 2), a water heater 54 was used as the heat source, but the heat source may be in other forms. For example, an air heater or a heat pump type heater may be utilized instead of or in addition to the water heater 54.

The invention claimed is:

1. An in-vehicle air conditioner comprising:
 a blower configured to send blown air to a vehicle compartment;
 a cooling device having a heat exchanger for cooling the blown air; and
 a controller configured to control the blower and the cooling device, wherein
 the controller operates the blower to perform a simplified pre-air-conditioning for introducing outside air into the vehicle compartment while the cooling device is stopped, in a case where an in-vehicle battery is being charged by an external power supply and no occupant is present in the vehicle compartment, and
 in the simplified pre-air-conditioning, the controller increases output of the blower during a predetermined period of time in a case where the cooling device has been operating immediately before an ignition switch is turned off, so as to be greater as compared to a case where the cooling device has not being operating immediately before the ignition switch is turned off.

2. The in-vehicle air conditioner according to claim 1, wherein
 during the period of time in which the output of the blower is increased in the simplified pre-air conditioning, the controller closes an air outlet from which the blown air is injected toward a front seat and opens another air outlet from which the blown air is injected toward a rear seat.

3. The in-vehicle air conditioner according to claim 2, wherein
 the controller avoids performing the simplified pre-air conditioning when:
 (i) an outside temperature is lower than a predetermined temperature that may cause the vehicle compartment to have a high temperature uncomfortable for the occupant, or
 (ii) an amount of sunlight irradiating the vehicle compartment is smaller than a predetermined amount of sunlight that may increase a temperature of the vehicle compartment.

4. The in-vehicle air conditioner according to claim 1, wherein
 the controller avoids performing the simplified pre-air-conditioning when:
 (i) an outside temperature is lower than a predetermined temperature that may cause the vehicle compartment to have a high temperature uncomfortable for the occupant, or
 (ii) an amount of sunlight irradiating the vehicle compartment is smaller than a predetermined amount of sunlight that may increase a temperature of the vehicle compartment.

* * * * *